(12) United States Patent
Space et al.

(10) Patent No.: US 10,737,791 B2
(45) Date of Patent: Aug. 11, 2020

(54) AEROSPACE VEHICLE ENVIRONMENTAL CONTROL SYSTEM

(71) Applicant: The Boeing Company, Chicago, IL (US)

(72) Inventors: David R. Space, Everett, WA (US);
Stephen M. Trent, Everett, WA (US);
Dale A. Scheer, Overland, MO (US);
Warren A. Atkey, Bothell, WA (US);
Anil Kumar Salgar, Mount Pleasant, SC (US)

(73) Assignee: THE BOEING COMPANY, Chicago, IL (US)

( * ) Notice: Subject to any disclaimer, the term of this patent is extended or adjusted under 35 U.S.C. 154(b) by 226 days.

(21) Appl. No.: 15/724,647

(22) Filed: Oct. 4, 2017

(65) Prior Publication Data
US 2019/0100318 A1 Apr. 4, 2019

(51) Int. Cl.
*B01D 53/04* (2006.01)
*B64D 13/06* (2006.01)
(Continued)

(52) U.S. Cl.
CPC ......... *B64D 13/06* (2013.01); *B01D 53/0438* (2013.01); *B01D 53/0454* (2013.01);
(Continued)

(58) Field of Classification Search
CPC ............ B01D 53/0438; B01D 53/0454; B01D 53/346; B01D 53/62; B01D 53/72;
(Continued)

(56) References Cited

U.S. PATENT DOCUMENTS

| 5,151,022 A | 9/1992 | Emerson et al. |
|---|---|---|
| 7,871,038 B2 | 1/2011 | Space et al. |

(Continued)

FOREIGN PATENT DOCUMENTS

| EP | 0745419 A2 | 12/1996 |
|---|---|---|
| EP | 2671801 A2 | 12/2013 |
| EP | 3090950 A1 | 11/2016 |

OTHER PUBLICATIONS

Honeywell Aerospace, Brochure Entitled "Air and Thermal Systems," Oct. 2008.
(Continued)

*Primary Examiner* — Frank M Lawrence, Jr.
(74) *Attorney, Agent, or Firm* — Coats & Bennett, PLLC

(57) ABSTRACT

An Environmental Control Systems (ECS) for an aerospace vehicle comprises an air supply airflow path inputting, monitoring, and conditioning air from external to the vehicle, and a recirculation airflow path inputting, monitoring, filtering, and moving air from one portion of the interior of the vehicle to another portion. The air supply airflow can include a dynamically controlled VOC/ozone converter, which can be operated when the aerospace vehicle is on the ground. The recirculation airflow path can include a dynamically controlled regenerative gas contaminant filter and/or VOC/CO2 removal device. The filter/adsorption media of the controlled regenerative gas contaminant filter and/or VOC/CO2 removal device can be regenerated by suppling hot air or a vacuum, and gaseous contaminants can be broken down for removal from the regenerative gas contaminant filter by controlling UV irradiation. The controller can alert a flight crew if air quality falls outside predetermined or programmable parameters.

20 Claims, 3 Drawing Sheets

(51) Int. Cl.
*B01D 53/86* (2006.01)
*B01D 53/72* (2006.01)
*B01D 53/62* (2006.01)
*B01D 53/96* (2006.01)
*B01D 53/34* (2006.01)

(52) U.S. Cl.
CPC ........... *B01D 53/346* (2013.01); *B01D 53/62* (2013.01); *B01D 53/72* (2013.01); *B01D 53/8696* (2013.01); *B01D 53/96* (2013.01); *B01D 2253/102* (2013.01); *B01D 2255/802* (2013.01); *B01D 2257/504* (2013.01); *B01D 2257/708* (2013.01); *B01D 2259/40088* (2013.01); *B01D 2259/4575* (2013.01); *B64D 2013/0651* (2013.01); *B64D 2013/0655* (2013.01); *B64D 2013/0685* (2013.01); *B64D 2013/0688* (2013.01)

(58) Field of Classification Search
CPC ................ B01D 53/8696; B01D 53/96; B01D 2253/102; B01D 2255/802; B01D 2257/504; B01D 2257/708; B01D 2259/40088; B01D 2259/4575; B64D 13/06; B64D 2013/0651; B64D 2013/0655; B64D 2013/0685; B64D 2013/0688

USPC ...... 96/109, 111, 121, 134; 95/11, 139, 143, 95/141
See application file for complete search history.

(56) References Cited

U.S. PATENT DOCUMENTS

| | | | |
|---|---|---|---|
| 2004/0134349 A1* | 7/2004 | Murley | B01D 53/0454 95/96 |
| 2006/0054025 A1 | 3/2006 | Kang et al. | |
| 2008/0283663 A1* | 11/2008 | Space | B64D 13/06 244/118.5 |
| 2009/0227195 A1* | 9/2009 | Buelow | B01D 53/88 454/156 |
| 2013/0327891 A1* | 12/2013 | Zhang | B64D 13/08 244/118.5 |
| 2014/0179212 A1 | 6/2014 | Space et al. | |
| 2015/0375187 A1* | 12/2015 | Yates | B01J 8/008 244/118.5 |
| 2018/0118351 A1* | 5/2018 | Fox | B64D 13/00 |

OTHER PUBLICATIONS

European Search Report dated Jan. 31, 2019, pp. 1-8, for corresponding EP application 181856690.7.

* cited by examiner

AEROSPACE VEHICLE ENVIRONMENTAL CONTROL SYSTEM

TECHNICAL FIELD

The present disclosure relates generally to aerospace vehicles, and in particular to systems and methods of automated environmental control, including managing regenerative gas contaminant filters, VOC/ozone converters, and similar air quality components.

BACKGROUND

Aerospace vehicles, including aircraft and spacecraft, often operate at altitudes where the air is inhospitable to humans. Accordingly, such vehicles are hermetically sealed and pressurized, and Environmental Control Systems (ECS) that manage interior air quality have long been a part of aerospace vehicle design. For example, U.S. Pat. No. 7,871,038, "Systems and Methods for Providing Airflow in an Aerospace Vehicle," issued Jan. 18, 2011 to the assignee of the present application describes, in the context of a passenger airplane, automated systems and methods to blend external air from an outside air supply with recirculated air. The '038 patent also describes controlling air quality parameters, such as the recirculation flow rate, based on factors such as contaminant level and temperature. Aspects of the present disclosure are similarly described herein in the context of a passenger airplane, although this is only to provide a context for description, and does not limit the scope of the disclosure.

A conventional approach to maintaining interior air quality has been to filter the interior air as part of a recirculation process, and also to "refresh" the air by mixing it with outside air. In order to increase the efficiency, range, & flexibility of the airplane, a more efficient method of providing airflow and maintaining equipment is desired to optimize airflow to what is required by the airplane and its passengers, while maintaining occupant comfort.

Standard sea level (SSL) air is 59° F. and at a pressure of 14.7 psi. At 35,000 feet, the air is −66° F. and 3.5 psi. Because of the very low temperature, outside air at high altitude contains very little moisture. Accordingly, to condition outside air for consumption in an airplane, it must be pressurized, heated, and humidified. All of these modifications require energy, and hence consume fuel. Additionally, air at high altitude contains significant levels of ozone ($O_3$).

It is known to deploy either an ozone converter or a combination Volatile Organic Compound (VOC) and ozone converter in passenger aircraft. The ozone and VOC/ozone converters can increase the aircraft maintenance load, as the converters must be periodically cleaned and eventually replaced. To extend converter life, it is typical to control the interior air to bypass ozone or VOC/ozone converters when contaminants exist which are bad for converters but not necessarily for people. For example, on the ground in an airport environment, there can be an elevated concentration of sulfur dioxide. This can have significant effects on the lifespan of an ozone converter.

The Background section of this document is provided to place examples of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of examples of the disclosure or to delineate the scope of the disclosure. The sole purpose of this summary is to present some concepts disclosed herein in a simplified form as a prelude to the more detailed description that is presented later.

According to examples of the present disclosure disclosed and claimed herein, an Environmental Control Systems (ECS) for an aerospace vehicle comprises an air supply airflow path inputting, monitoring, and conditioning air from external to the vehicle, and a recirculation airflow path inputting, monitoring, filtering, and moving air from one portion of the interior of the vehicle to another portion. The air supply airflow can include a dynamically controlled VOC/ozone converter, which can be operated when the aerospace vehicle is on the ground. The recirculation airflow path can include a dynamically controlled regenerative gas contaminant filter and/or VOC/CO2 removal device. The filter/adsorption media of the controlled regenerative gas contaminant filter and/or VOC/CO2 removal device can be regenerated by suppling hot air or a vacuum, and VOCs can be broken down for removal from the VOC/CO2 removal device by controlling UV irradiation. The controller can alert a flight crew if air quality falls outside predetermined or programmable parameters.

One example relates to an aerospace vehicle system. The system includes an external air supply device operative to selectively provide external air into an interior volume of an aerospace vehicle. The vehicle has an interior volume comprising at least a first interior volume portion and a second interior volume portion. The system also includes a recirculation device operative to selectively move air between the first and second interior volume portions of the interior volume; a regenerative gas contaminant filter operative to remove gas contaminants from air; a plurality of bypass valves, each operative to selectively direct some or all of an airflow directed through the bypass valve either into or around a downstream component; and one or more air quality sensors. The system further includes a controller operatively connected to the external air supply device, recirculation device, regenerative gas contaminant filter, bypass valves, and air quality sensors, and operative to control one or more of the external air supply device, recirculation device, regenerative gas contaminant filter, and bypass valves in response to air quality deduced from the air quality sensors.

In one example, the controller is operative to control an amount of recirculated air routed through the regenerative gas contaminant filter in response to air quality deduced from the air quality sensors.

In one example, one or more air quality sensors comprise an upstream air quality sensor upstream of the regenerative gas contaminant filter and a downstream air quality sensor downstream of the regenerative gas contaminant filter, and wherein the controller is operative to cause the regenerative gas contaminant filter to regenerate by removing contaminants in response to a difference in air quality deduced from comparing outputs of the upstream and downstream air quality sensors.

In one example, a contaminant removed by the regenerative gas contaminant filter is carbon dioxide.

In one example, a contaminant removed by the regenerative gas contaminant filter is an organic compound.

In one example, the regenerative gas contaminant filter comprises at least two filter banks of filter material, and wherein the controller is further operative to cause the regenerative gas contaminant filter to direct recirculated air to a second filter bank of filter material when regenerating a first filter bank of filter material.

In one example, the regenerative gas contaminant filter uses a sorbent to sorb contaminant gases from the air.

In one example, the controller is operative to cause the regenerative gas contaminant filter to remove contaminants by applying a vacuum to the sorbent.

In one example, the controller is operative to cause the regenerative gas contaminant filter to remove contaminants by applying air to the sorbent at a temperature of at least 140° F.

In one example, the air at a temperature of at least 140° F. is trim air from a jet engine.

In one example, the air at a temperature of at least 140° F. is air heated by a heater.

In one example, the regenerative gas contaminant filter is an active filter using a photo catalytic oxidation bed to sorb contaminant gases from the air.

In one example, the controller is operative to cause the regenerative gas contaminant filter to remove contaminants by irradiating the photo catalytic oxidation bed with ultraviolet light to activate a catalyst which breaks down the contaminants into base compounds.

In one example, the controller is operative to cause the regenerative gas contaminant filter to irradiate the photo catalytic oxidation bed with ultraviolet light by controlling a voltage level applied to an ultraviolet light source in the regenerative gas contaminant filter.

In one example, aerospace vehicle system further comprises an ozone converter, and the controller is operative to control an amount of air routed through the ozone converter in response to air quality deduced from the air quality sensors.

In one example, the ozone converter is a VOC/ozone converter that is further operative to remove volatile organic compounds (VOC) from the air.

In one example, the controller is operative to route air through the VOC/ozone converter in response to signals from air quality sensors when the aerospace vehicle is on the ground.

In one example, aerospace vehicle system further comprises a CO2 removal device, and the controller is operative to control an amount of air routed through the CO2 removal device in response to air quality deduced from the air quality sensors.

In one example, the CO2 removal device is a VOC/CO2 removal device that is further operative to remove volatile organic compounds (VOC) from the air.

In one example, the aerospace vehicle system further comprises a alert device having a human interface, and the controller is further operative to: detect a fault or failure of one or more of the external air supply device, a VOC/ozone converter, the recirculation device, the regenerative gas contaminant filter, and a VOC/CO2 removal device; and output an indication of the fault or failure to the alert device, for alerting a flight crew.

In one example, the controller is further operative to: isolate the external air supply device, VOC/ozone converter, recirculation device, regenerative gas contaminant filter, or VOC/CO2 removal device having a fault or failure condition; and control the operative external air supply device, VOC/ozone converter, recirculation device, regenerative gas contaminant filter, or VOC/CO2 removal device to compensate for the failure and maintain air quality.

In one example, the aerospace vehicle system further comprises one or more humidity sensors, and the controller is operative to control one or more of the external air supply device, recirculation device, and regenerative gas contaminant filter in response to relative humidity deduced from the humidity sensors.

Another example relates to a method of controlling air quality in an interior of an aerospace vehicle having an interior volume comprising at least a first interior volume portion and a second interior volume portion, an external air supply device operative to selectively provide external air into the interior volume, a recirculation device operative to selectively move air between the first and second portions of the interior volume, and a plurality of bypass valves, each operative to selectively direct some or all of an airflow directed through the bypass valve either into or around a downstream component. Air quality is monitored by reading one or more air quality sensors disposed within the interior volume of the aerospace vehicle. In response to the monitored air quality, the external air supply device and recirculation device are controlled to control a mix of fresh and recirculated air in at least the first interior volume portion of the interior volume of the aerospace vehicle. Also in response to the monitored air quality, one or more bypass valves are controlled to route a selected portion of recirculated air through one or more regenerative gas contaminant filters operative to remove gas contaminants from air.

In another example, monitoring air quality by reading one or more air quality sensors disposed within the interior volume of the aerospace vehicle comprises monitoring operation of a regenerative gas contaminant filter by comparing one or more outputs of air quality sensors disposed upstream and downstream of the regenerative gas contaminant filter, and further comprising regenerating the regenerative gas contaminant filter by removing contaminants from the regenerative gas contaminant filter.

In another example, a contaminant removed by the regenerative gas contaminant filter is carbon dioxide.

In another example, the regenerative gas contaminant filter comprises at least two filter banks of filter material, and wherein regenerating the regenerative gas contaminant filter further comprises directing recirculated air to a second filter bank of filter material when regenerating a first bank of filter material.

In another example, regenerating the regenerative gas contaminant filter comprises applying a vacuum to the regenerative gas contaminant filter.

In another example, regenerating the regenerative gas contaminant filter comprises applying air of at least 140° F. to the regenerative gas contaminant filter.

In another example, applying air of at least 140° F. to the regenerative gas contaminant filter comprises directing trim air from a jet engine to the regenerative gas contaminant filter.

In another example, wherein regenerating the regenerative gas contaminant filter comprises irradiating a filter material with ultraviolet light.

In another example, irradiating a filter material with ultraviolet light comprises controlling a voltage level applied to an ultraviolet light source in the regenerative gas contaminant filter.

In another example, the aerospace vehicle further includes an ozone converter, and the method further comprises controlling an amount of air routed through the ozone converter in response to the monitored air quality.

In another example, the ozone converter is a VOC/ozone converter that is further operative to remove volatile organic compounds (VOC) from the air.

In another example, the method further comprises routing air through the VOC/ozone converter in response to the monitored air quality when the aerospace vehicle is on the ground.

In another example, the aerospace vehicle further includes an ozone converter, and the method further comprises controlling an amount of air routed through the CO2 removal device in response to air quality deduced from the air quality sensors.

In another example, the CO2 removal device is a VOC/CO2 removal device that is further operative to remove volatile organic compounds (VOC) from the air.

In another example, the aerospace vehicle further includes an alert device having a human interface, and the method further comprises: detecting a fault or failure of one or more of the external air supply device, a VOC/ozone converter, the recirculation device, the regenerative gas contaminant filter, and a VOC/CO2 removal device; and outputting an indication of the fault or failure to the alert device, for altering a flight crew.

In another example, the method further comprises: isolating the external air supply device, VOC/ozone converter, recirculation device, regenerative gas contaminant filter, or VOC/CO2 removal device having a fault or failure condition; and controlling the operative external air supply device, VOC/ozone converter, recirculation device, regenerative gas contaminant filter, or VOC/CO2 removal device to compensate for the failure and maintain air quality.

In another example, the aerospace vehicle further includes one or more humidity sensors, and the method further comprises controlling one or more of the external air supply device, recirculation device, and regenerative gas contaminant filter in response to relative humidity deduced from the humidity sensors.

BRIEF DESCRIPTION OF THE DRAWINGS

The present disclosure will now be described more fully hereinafter with reference to the accompanying drawings, in which examples of the disclosure are shown. However, this disclosure should not be construed as limited to the examples set forth herein. Rather, these examples are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an example thereof. In the following description, numerous specific details are set forth in order to provide a thorough understanding of the present disclosure. However, it will be readily apparent to one of ordinary skill in the art, after reading this disclosure that the present disclosure may be practiced without limitation to these specific details. In this description, well known methods and structures have not been described in detail so as not to unnecessarily obscure the present disclosure.

Figure 1:
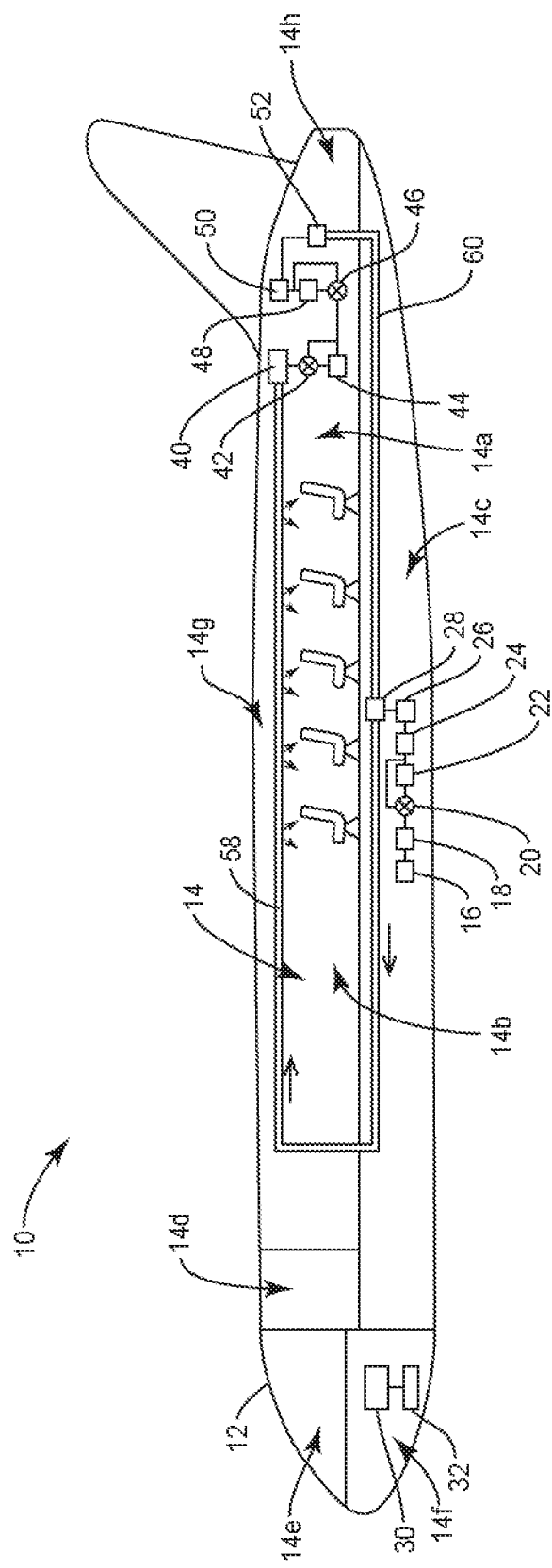
FIG. 1 is a section view of an aerospace vehicle, in particular a passenger aircraft.

FIG. 1 depicts a section view of an aerospace vehicle system 10, comprising an aerospace vehicle 12, which in the example depicted is a passenger aircraft. The aerospace vehicle 12 has an interior volume 14, which comprises at least a first interior volume portion 14a in the aft passenger seating area, and a second interior volume portion 14b in the forward passenger seating area. The interior volume 14 can be further divided into distinct portions, or spaces, such as a luggage compartment 14c, a special use area 14d (e.g., a galley or lavatory), a flight deck area or cockpit 14e, an electronics bay 14f, overhead bins 14g, an aft tail cone area 14h, and the like. Each of these areas or portions of the interior volume 14 of the aerospace vehicle 12 can have different requirements for pressurization, air quality, temperature, humidity, and the like. For example, the luggage compartment 14c, electronics bay 14f, overhead bins 14g, an aft tail cone area 14h are preferably be supplied with very low humidity air, to prevent condensation. In contrast, passenger areas, such as the first and second interior volume portions 14a, 14b, special use area 14d, and cockpit 14e require a relative humidity in the range of 25-60% for human comfort. In other aerospace vehicle systems 10, e.g., cargo or military aircraft, or other aerospace vehicles 12 such as spacecraft, the interior volume 14 can be divided differently, and different areas can have different requirements for pressurization, air quality, temperature, humidity, and the like.

Various aspects of the present disclosure are described herein within the context of managing airflow and the air quality primarily in and between the first interior volume portion 14a and second interior volume portion 14b, in which air quality is critical for passenger comfort, and which presents the greatest challenges to air quality management due to the large concentration of people. However, this environment does not limit the scope of the disclosure. Those of skill in the art may readily adapt the teachings of the present disclosure to the management of airflow and air quality to and between the various interior spaces in different aerospace vehicle systems 10, as required for any particular deployment.

Figure 2:
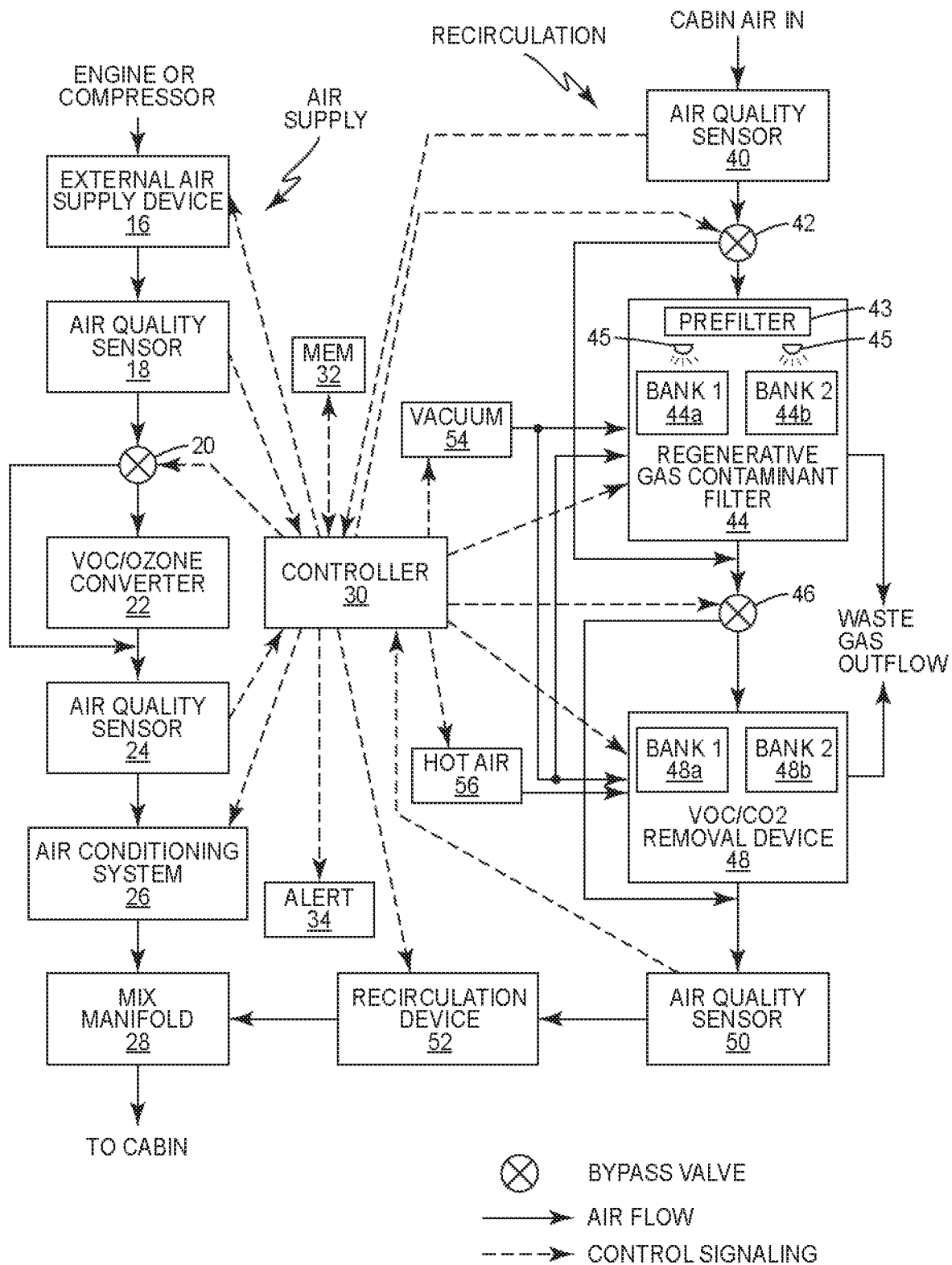
FIG. 2 is a block diagram of an example aerospace vehicle ECS.

According to aspects of the present disclosure, air quality in the interior volume 14 of aerospace vehicle 12 is managed by components of an aerospace vehicle system 10, which may be referred to as the Environmental Control Systems (ECS). A controller 30, operatively connected to memory 32, controls various components comprising two basic airflow paths. As depicted in FIG. 2, the ECS comprises both an "air supply" path and a "recirculation" path. The air supply path takes in external air, typically from an engine or compressor, optionally directs it through a VOC/ozone converter 22, conditions the air, and mixes it with air recirculated within at least some portions of the interior volume 14. As described above, due to the conditions of air at altitude, extensive conditioning (pressurizing, heating, and humidifying) of the external air is required, which consumes energy and hence increases fuel burn. Accordingly, the ECS also comprises a recirculation air path, which recirculates air, such as from the first interior volume portion 14a to the second interior volume portion 14b. To maintain the quality of recirculated air, the controller 30 optionally directs some or all of the air through a regenerative gas contaminant filter 44 and/or a VOC/CO2 removal device 48. The filtered, recirculated air is then mixed with conditioned external air and distributed throughout selected portions of the interior volume 14.

In the example depicted in FIG. 2, the air supply path includes an external air supply device 16, an upstream air quality sensor 18, a bypass valve 20, a VOC/ozone converter 22, a downstream air quality sensor 24, an air conditioning system 26, and a mix manifold 28. The aerospace vehicle 12 includes an external air supply device 16 operative to selectively intake air from the exterior of the aerospace vehicle 12, such as from an engine or compressor. The controller 30 controls the external air supply device 16 to input none, or a specified amount of external air, e.g., as measured by volumetric flow rate or mass flow rate.

The upstream air quality sensor 18 monitors the external air, and can measure, and report to the controller 30, parameters such as temperature, pressure, humidity, VOC and/or ozone (or other contaminant) concentration, and the like.

Based on the parameters sensed and reported by the upstream air quality sensor 18, the controller 30 controls the bypass valve 20 to divert none, some, or all of the airflow through a downstream component, such as the VOC/ozone converter 22. The VOC/ozone converter 22 can break down $O_3$ and/or organic compounds from the airstream into base components such as H2O and CO2. In one aspect, the controller 30 is operative to direct some or all of the external air through the VOC/ozone converter 22 when the aerospace vehicle 12 is on the ground. This capability allows for management of air quality, and concomitant passenger comfort, during extended ground periods, such as when the aerospace vehicle 12 is stuck at a gate due to congestion or weather.

Operation of the VOC/ozone converter 22 is monitored by the by the controller 30, e.g., by comparing the level of VOC or ozone in the air as reported by the upstream air quality sensor 18 and a downstream air quality sensor 24. By monitoring the VOC/ozone converter 22, the controller 30 can gauge its effectiveness, for example to determine when to change a catalyst. In one aspect, the controller 30 determines the amount of external air to direct to the VOC/ozone converter 22 (by controlling the bypass valve 20), by comparison of the upstream and downstream air quality sensor 18, 24, outputs.

The outside air is then conditioned by the air conditioning system 26, to pressurize, heat, or cool it as appropriate for human comfort. The conditioned external air is then mixed with recirculated air in a mix manifold 28, and distributed to, e.g., the second interior volume portion 14b, the special use area 14d, and the cockpit 14e.

The ECS also comprises a recirculation air path, as depicted on the right side of FIG. 2. Cabin air is taken up, such as from the first interior volume portion 14a, and directed through or over an upstream air quality sensor 40. The upstream air quality sensor 40 can have the ability to detect the level, or concentration, of various known contaminants. Based on the contaminant level reported by the upstream air quality sensor 40, the controller 30 is operative to output control signals that cause the bypass valve 42 to divert none, some, or all of the airflow through a regenerative gas contaminant filter 44. The regenerative gas contaminant filter 44 is operative to remove particulate and gaseous contaminants from the air. As discussed further herein, the regenerative gas contaminant filter 44 can comprise two or more filter banks 44a, 44b of filter material, such as a sorbent material.

The recirculation air path of the ECS can also include a VOC/CO2 removal device 48, operative to remove VOCs and/or CO2 from the air. The controller 30 is operative to output control signals that cause a second bypass valve 46 to divert none, some, or all of the airflow through the VOC/CO2 removal device 48, for example based on a level of VOCs or CO2 detected and reported by the upstream air quality sensor 40. The $VOC/CO_2$ removal device 48 may also include two or more filter banks 48a, 48b of sorbent.

A downstream air quality sensor 50 monitors air from the regenerative gas contaminant filter 44 and VOC/CO2 removal device 48, and reports the sensed contaminant level to the controller 30. By comparing contaminant levels indicated by the upstream and downstream air quality sensors 40, 50, the controller 30 can monitor the operation of the ECS components 44, 48, and adjust one or both of the bypass valves 42, 46 to control the levels of contaminants, VOCs, and CO2 in the recirculated air. As further discussed herein, the comparison can also indicate the need for regeneration of the components 44, 48, for example if some or all of the airflow is directed through either the regenerative gas contaminant filter 44 or VOC/CO2 removal device 48, or both, yet the downstream air quality sensor 50 does not report a sufficiently lower level of contaminant, VOC, or CO2 than the upstream air quality sensor 40.

The regenerative gas contaminant filter 44 can include an initial, conventional pre-filter 43, such as a high efficiency particulate air (HEPA) filter or high efficiency filter with nano-material fibers (HENF). The pre-filtered air can then pass through or over the first filter bank 44a or second filter bank 44b of a sorbent such as activated carbon. The regenerative gas contaminant filter 44 can additionally include photo-catalytic oxidation (PCO) devices (not shown). The regenerative gas contaminant filter 44 can trap particulate and gaseous contaminants, and/or can catalytically break down the gaseous contaminants, e.g., into H2O, CO2, and similar simple compounds, thus removing the contaminants from the recirculation air flow.

CO2 removal devices have not previously been used on aerospace vehicles 12. However, CO2 is a metabolic byproduct of respiration; the average human exhales almost a kilogram of CO2 daily. As ventilation rates change, CO2 removal can be necessary. In some implementations, a CO2 removal device can additionally remove VOCs from the recirculated air, further enhancing air quality, eliminating offensive odor, and enhancing passenger comfort. Although the example of FIG. 2 depicts a combined VOC/CO2 removal device 48, those of skill in the art will recognize that a similar component may remove only VOCs or only CO2.

A known limitation of conventional air filters is their decaying filtration effectiveness over time, as the filters fill with particulates and contaminants, requiring regular filter changes. As the name suggests, a regenerative gas contaminant filter 44 can be "regenerated" to restore it to full or near-full effectiveness, without requiring regular filter changes. Sorbents such as activated carbon can be regenerated with heat, vacuum, or both. Similarly, sorbents in a $VOC/CO_2$ removal device 48 can be renewed by vacuum or heat.

Based on, e.g., a comparison of the air quality sensed by upstream and downstream air quality sensors 40, 50, the controller 30 can determine that one or both of the regenerative gas contaminant filter 44 and VOC/CO2 removal device 48 require regeneration. In one or both of these components 44, 48, two (or more) filter banks 44a, 44b, 48a, 48b of filter/sorbent material may be provided, whereby the entire airflow through the respective components 44, 48 is selectively directed through or over only one such filter bank 44a, 44b, 48a, 48b of filter/sorbent material. When the controller directs the regenerative gas contaminant filter 44 and/or VOC/CO2 removal device 48 to regenerate its filter/sorbent material, the respective component 44, 48, can divert airflow to the alternate filter bank 44a, 44b, 48a, 48b of filter/sorbent material—that is, the one not being regenerated—so as to continue to "scrub" the air.

The controller 30 can direct a hot air source 56 to supply high-temperature air to either or both of the regenerative gas contaminant filter 44 and VOC/CO2 removal device 48, as required, for heat-based regeneration. One example of a hot air source 56 is "trim air," which is high-temperature air from one or more jet engines. Trim air is typically in the range 250°-450° F. As an alternative to trim air from an engine, the hot air source 56 may be a heater. As used herein, applying high-temperature air for regeneration means applying air at or above 140° F.

The controller 30 can direct a vacuum source 54 to supply negative delta pressure air to either or both of the regenerative gas contaminant filter 44 and VOC/CO2 removal device 48, as required, for vacuum-based regeneration.

The controller 30 can also control the intensity of one or more ultraviolet (UV) light sources within the regenerative gas contaminant filter 44, such as one or more UV LEDs 45. For example, the regenerative gas contaminant filter 44 may include two or more filter banks 44a, 44b of active filter using a photo catalytic oxidation (PCO) bed to sorb contaminant gases from the air. Unlike activated carbon, the PCO filter banks 44a, 44b can be independently regenerated to remove sorbed contaminants by irradiating the filter banks 44a, 44b of PCO material with ultraviolet light, to activate a catalyst which breaks down the contaminants into base compounds, such as $H_2O$, $CO_2$, or the like. As used herein, ultraviolet light includes electromagnetic radiation with a wavelength between 10 nm and 400 nm. In this case, the controller 30 can regenerate either or both the first filter bank 44a and second filter bank 44b of the regenerative gas contaminant filter 44 by controlling a voltage level applied to power the associated UV LEDs 45, thus controlling the level of UV irradiation of the relevant filter bank 44a, 44b of PCO material.

During regeneration, the controller 30 can control one or both of the regenerative gas contaminant filter 44 and VOC/CO2 removal device 48, as well as valves in a gas transport manifold or piping, to output waste gas to the exterior of the aerospace vehicle 12. This removes the waste gas from the filter/sorbent material, allowing for the removal of more contaminants, VOCs, and/or CO2 from recirculated air.

Air exiting the regenerative gas contaminant filter 44 and/or VOC/CO2 removal device 48 is sensed by a downstream air quality sensor 50, which reports the level of contaminants, VOC, and/or CO2 to the controller 30. The air then flows into a recirculation device 52, which includes a fan or other air motive device operative to move recirculated air from, e.g., a first interior volume portion 14a to, e.g., a second interior volume portion 14b. The controller 30 can control the recirculation device 52 to alter the recirculated airflow rate, such as by controlling the voltage of a recirculation fan. Recirculated air then flows into the mix manifold 28, where it mixes with any outside air flowing from the air supply airflow path. The combined air is then distributed throughout the relevant spaces in the interior volume 14, such as into an air passage 58, from which air is supplied to the passenger seating areas.

The controller 30 monitors air quality to both the air supply and recirculation airflow paths, such as by receiving signals from air quality sensors 18, 24, 40, 50. While the primary purpose and use of this information is to control various bypass valves 20, 42, 46 and other system components, the controller 30 is also operative to sound an alarm, or otherwise alert a flight crew if the air quality falls outside of predetermined or programmable bounds, indicating a fault or failure of one or more components 16-28, 40-56. The controller 30 can send appropriate signals to an alert device 34, which can comprise a visible or audible alarm, or can comprise an interface into, e.g., an aircraft maintenance computer which has a human interface.

Figure 3:
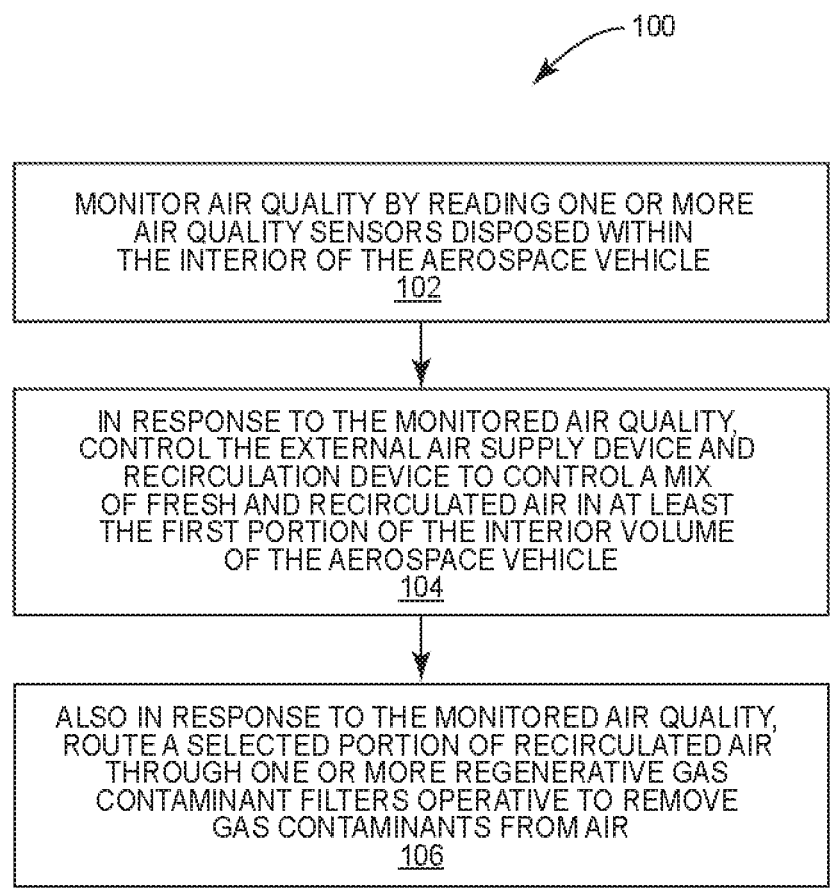
FIG. 3 is a flow diagram of an example method of controlling air quality in the interior of an aerospace vehicle.

FIG. 3 depicts the steps of a method 100 of controlling air quality in the interior of an aerospace vehicle 12 having an interior volume 14 comprising at least a first interior volume portion 14a and a second interior volume portion 14b. The aerospace vehicle 12 also has an external air supply device 16 operative to selectively provide external air into the interior volume 14, and a recirculation device operative 52 to selectively move air between a first interior volume portion 14a and second interior volume portion 14b. The aerospace vehicle 12 further has a plurality of bypass valves 20, 42, 46, each operative to selectively direct some or all of an airflow directed through the bypass valve 20, 42, 46 either into or around a downstream component 22, 44, 48. The method 100 can be performed by a controller 30.

Air quality is monitored by reading one or more air quality sensors 18, 24, 40, 50 disposed within the interior volume 14 of the aerospace vehicle 12 (block 102). In particular, air quality sensors 18, 24 and 40, 50 can be paired in upstream/downstream relationship with respect to one or more ECS components 22 and 44, 48, respectively. In response to the monitored air quality, the external air supply device 16 and recirculation device 52 are controlled to provide a mix of fresh and recirculated air in at least the first interior volume portion 14a of the aerospace vehicle 12 (block 104). Also in response to the monitored air quality (or difference between upstream and downstream air quality sensors 40, 50), one or more bypass valves 42, 46 are controlled to route a selected portion of recirculated air through one or more regenerative gas contaminant filters 44 operative to remove gas contaminants from air (block 106). Similarly, the controller 30 can route selected portions of recirculated air through one or more VOC/CO2 removal devices 48, and/or can route selected portions of external air through one or more VOC/ozone converters 22. The conditioned external and filtered recirculated air are then combined and distributed to at least a second interior volume portion 14b.

As used herein, the term "air quality sensor" refers to any sensor that is operative to detect and report one or more physical properties of air, such as temperature, pressure, humidity, oxygen level, the presence and/or level of one or more gaseous contaminants such as $CO_2$ or VOCs, and the like, and the presence and/or level of one or more particulate contaminants. Air quality sensors 18, 24, 40, 50 can simply output an analog signal indicative of a measured parameter, or can include a digital interface operative to respond to queries from the controller 30. Air quality sensors 18, 24, 40, 50 can continuously monitor the air in a space or airflow directed over the sensor, and can continuously or periodically output a signal or digital communication indicative of the measured parameter(s). Alternatively, an air quality sensor 18, 24, 40, 50 can take a reading and generate an output only upon a command from the controller 30. As still another alternative, an air quality sensor 18, 24, 40, 50 can continuously or periodically monitor air in its environment, but only output a signal autonomously upon detecting a predetermined or programmed condition, such as the presence of smoke or an excessive level of a gaseous contaminant.

The controller 30 can comprise any sequential state machine operative to execute machine instructions stored as machine-readable computer programs in memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above. The controller 30 is operative to receive inputs from air quality sensors 18, 24, 40, 50 and other components in the ECS, and is operative to generate control signal outputs that control the actuation of bypass valves 20, 42, 46, as well as various fans, motors, lamps, and the like (not shown), in response to one or more programs stored in memory 32. The memory 32, which can be internal to the controller 30 or can be separate, may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. The controller can communicate with various ECS components 16-26, 34, 40-56 via wired or wireless links, either directly or through a communication bus according to a known protocol.

The present disclosure may, of course, be carried out in other ways than those specifically set forth herein without departing from essential characteristics of the disclosure. The present examples are to be considered in all respects as illustrative and not restrictive, and all changes coming within the meaning and equivalency range of the appended claims are intended to be embraced therein.

What is claimed is:

1. An aerospace vehicle system, comprising:
    an external air supply device operative to selectively provide external air into an interior volume of an aerospace vehicle having the interior volume comprising at least a first interior volume portion and a second interior volume portion;
    a recirculation device operative to selectively move air between the first and second interior volume portions of the interior volume;
    a regenerative gas contaminant filter operative to remove gas contaminants from air;
    a plurality of bypass valves, each operative to selectively direct some or all of an airflow directed through the plurality of bypass valves either into or around a downstream component;
    air quality sensors; and
    a controller operatively connected to the external air supply device, recirculation device, regenerative gas contaminant filter, plurality of bypass valves, and air quality sensors, and operative to control the external air supply device, recirculation device, regenerative gas contaminant filter, and plurality of bypass valves in response to air quality deduced from the air quality sensors;
    wherein the controller is operative to control an amount of recirculated air routed through the regenerative gas contaminant filter in response to air quality deduced from the air quality sensors; and
    wherein the air quality sensors comprise an upstream air quality sensor upstream of the regenerative gas contaminant filter and a downstream air quality sensor downstream of the regenerative gas contaminant filter, and the controller is operative to cause the regenerative gas contaminant filter to regenerate by removing contaminants in response to a difference in air quality deduced from comparing outputs of the upstream and downstream air quality sensors.

2. The aerospace vehicle system of claim 1 wherein the regenerative gas contaminant filter comprises at least two filter banks of filter material containing a sorbent to sorb contaminant gases from the air, and wherein the controller is further operative to cause the regenerative gas contaminant filter to direct recirculated air to a second filter bank of filter material when regenerating a first filter bank of filter material.

3. The aerospace vehicle system of claim 1 wherein the controller is operative to cause the regenerative gas contaminant filter to remove contaminants during regeneration by applying one of a vacuum and air at a temperature of at least 140° F. to the sorbent.

4. The aerospace vehicle system of claim 2 wherein
    the regenerative gas contaminant filter is an active filter using a photo catalytic oxidation bed to sorb contaminant gases from the air; and
    the controller is operative to cause the regenerative gas contaminant filter to remove contaminants by irradiating the photo catalytic oxidation bed with ultraviolet light, by controlling a voltage level applied to an ultraviolet light source in the regenerative gas contaminant filter, to activate a catalyst which breaks down the contaminants into base compounds.

5. The aerospace vehicle system of claim 1 further comprising an ozone converter, and wherein the controller is operative to control an amount of air routed through the ozone converter in response to air quality deduced from the air quality sensors.

6. The aerospace vehicle system of claim 5 wherein the ozone converter is a VOC/ozone converter that is further operative to remove volatile organic compounds (VOC) from the air, including when the aerospace vehicle is on the ground.

7. The aerospace vehicle system of claim 1 further comprising a CO2 removal device, and wherein the controller is operative to control an amount of air routed through the CO2 removal device in response to air quality deduced from the air quality sensors.

8. The aerospace vehicle system of claim 7 wherein the CO2 removal device is a VOC/CO2 removal device that is further operative to remove volatile organic compounds (VOC) from the air.

9. The aerospace vehicle system of claim 1 further comprising an alert device having a human interface, and wherein the controller is further operative to:
    detect a fault or failure of one or more of the external air supply device, a VOC/ozone converter, the recirculation device, the regenerative gas contaminant filter, and a VOC/CO2 removal device;
    output an indication of the fault or failure to the alert device, for alerting a flight crew;
    isolate the external air supply device, VOC/ozone converter, recirculation device, regenerative gas contaminant filter, or VOC/CO2 removal device having a fault or failure condition; and
    control the operative external air supply device, VOC/ozone converter, recirculation device, regenerative gas contaminant filter, or VOC/CO2 removal device to compensate for the failure and maintain air quality.

10. The aerospace vehicle of claim 1 wherein the controller is configured to direct all of the air through the regenerative gas contaminant filter.

11. The aerospace vehicle of claim 1 wherein the air quality sensors include an air sensor that monitors the external air and measures one or more of temperature, pressure, humidity, ozone, and volatile organic compounds.

12. The aerospace vehicle of claim 1 wherein the regenerative gas contaminant filter comprises one of an initial high efficiency particulate air filter and a high efficiency filter with nano-material fibers.

13. The aerospace vehicle of claim 1 wherein the controller is configured to divert some of the airflow through the regenerative gas contaminant filter.

14. The aerospace vehicle of claim 1 further comprising an air conditioning system to condition the external air prior to mixing with the recirculated air.

15. The aerospace vehicle of claim 1 wherein the controller is configured to determine that the regenerative gas contaminant filter requires regeneration.

16. The aerospace vehicle of claim 15 further comprising a hot air source that supplies high-temperature air to the regenerative gas contaminant filter to regenerate the filter.

17. The aerospace vehicle of claim 15 further comprising a vacuum source to supply negative pressure air to the regenerative gas contaminant filter to regenerate the filter.

18. The aerospace vehicle of claim 5, further comprising an air condition system to condition the air after the air has moved through the ozone converter.

19. The aerospace vehicle of claim 1 further comprising a mix manifold that receives the recirculated air and the external air prior to distribution into the interior volume of the aerospace vehicle.

20. The aerospace vehicle of claim 5 wherein the controller is operative to divert all of the air through the ozone converter.

* * * * *